(12) United States Patent
Bright

(10) Patent No.: US 6,485,803 B1
(45) Date of Patent: *Nov. 26, 2002

(54) LABELS WITH DELAYED ADHESIVE ACTIVATION

(75) Inventor: Lyn E. Bright, Ceres, CA (US)

(73) Assignee: B&H Manufacturing Company, Inc., Ceres, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 680 days.

(21) Appl. No.: 08/888,482

(22) Filed: Jul. 7, 1997

Related U.S. Application Data

(60) Provisional application No. 60/021,701, filed on Jul. 12, 1996.

(51) Int. Cl.⁷ ............................................... B65B 53/06
(52) U.S. Cl. ..................... 428/35.1; 428/344; 428/41.8; 428/914; 156/86
(58) Field of Search ..................... 156/86, 446, 449, 156/450, 458, 499, 521, 556, DIG. 11, DIG. 20, DIG. 21, DIG. 35, DIG. 36, DIG. 37; 428/34.9, 35.1, 41.8, 914

(56) References Cited

U.S. PATENT DOCUMENTS

| | | |
|---|---|---|
| 3,822,459 A | 7/1974 | Amberg et al. |
| 3,905,854 A | 9/1975 | Kaercher et al. |
| 4,016,706 A * | 4/1977 | Braker et al. ............... 156/86 |
| 4,025,378 A | 5/1977 | Amsden et al. |
| 4,315,573 A | 2/1982 | Bradley et al. |
| 4,461,793 A * | 7/1984 | Blok et al. ............... 428/34.9 |
| 4,704,173 A | 11/1987 | Hoffman |
| 4,714,515 A * | 12/1987 | Hoffmann ............... 156/450 |
| 4,802,509 A | 2/1989 | Brandolf ............... 138/110 |
| 4,844,760 A | 7/1989 | Dickey |
| 4,961,811 A * | 10/1990 | Haugwitz ............... 156/344 |
| 5,089,338 A | 2/1992 | Anderson et al. |
| 5,137,596 A | 8/1992 | Potter |
| 5,352,308 A | 10/1994 | Tomihara et al. |
| 5,376,699 A | 12/1994 | Sage |
| 5,403,416 A * | 4/1995 | Bright et al. ............... 156/86 |
| 5,791,553 A * | 8/1998 | Fabel ............... 229/92.1 |

FOREIGN PATENT DOCUMENTS

| | | |
|---|---|---|
| CA | 1012906 | 6/1977 |
| EP | 0 208 261 A2 | 7/1986 |
| EP | 0 408 016 A1 | 7/1990 |
| EP | 0 437 353 A1 | 1/1991 |
| FR | 2050035 * | 3/1971 |
| GB | 2118680 A | 11/1983 |

\* cited by examiner

*Primary Examiner*—Sam Chuan Yao
(74) *Attorney, Agent, or Firm*—LaRiviere, Grubman & Payne, LLP

(57) ABSTRACT

The process for applying labels to articles by first adhering a limited portion of the label to the article and subsequently rendering additional portions of the label adhesive so that they will adhere to the article after the label is affixed to the article. The leading and trailing edges of the label may be bonded to the article or each other to affix the label to a container or other such article. The portions of the label between the leading and trailing edges may be either provided with an adhesive agent that is in a non-adhesive state or be formed from a label material which is not normally adhesive but can be rendered adhesive through an additional process step. For example, coated polyethylene film can be applied to a container by means of a hot melt adhesive and then subsequently heated to a temperature at which the polyethylene material becomes adhesive causing it to stick to the container. Other labeling materials can be printed with an adhesive that remains substantially non-adhesive until heated or activated by means of radiation, application of a chemical activating agent or by application of mechanical force.

8 Claims, 3 Drawing Sheets

LABELS WITH DELAYED ADHESIVE ACTIVATION

This application claims the benefit of U.S. Provisional Application No. 60/021,701, filed Jul. 12, 1996.

TECHNICAL FIELD

The present invention relates to labeling articles with labeling material that can be rendered adhesive subsequent to its application to the article.

BACKGROUND ART

Articles are labeled to identify the contents of containers and provide attractive point of sale product presentation. Labels are applied by roll-fed, sleeve, or cut and stack methods. Different labeling materials have been developed including paper labels, film labels, laminated film and paper labels, styrene foam, and laminated film and foam. The appearance of labeled containers can be improved by shrinking plastic label material to fit tightly around the container and even follow the contours of a container to provide an enlarged billboard appearance.

Generally, labels are either spot-adhered to articles or are applied as pressure sensitive labels. Pressure sensitive labels generally are completely coated with an adhesive material and are one of the most expensive labeling options. Labels are also applied to containers by adhesive applied immediately prior to labeling. The adhesive may be applied in a variety of patterns including leading and trailing edge, spaced dots, picture frame, or overall adhesive.

In some applications, the minimum amount of adhesive is desired, particularly if a container is to be recycled. The prior art has failed to provide an inexpensive and effective labeling process that minimizes the use of adhesives, solvents, or complex welding mechanisms.

Other applications are better suited to a fully adhered label for an article or container. Generally, the more adhesive that is applied to a label, the greater the likelihood that the label will develop wrinkles or surface distortions. Distortions can also be caused by heat shrinking label material over the top of adhesive spots.

One application where a completely adhesive surface is desirable is where a label is to be applied over a previously printed can. Such a process would make it possible to use cans that have an outmoded decoration. By fully adhering a label to an overlabeled container, removal of the label can be substantially prevented or impeded.

Another situation where a fully adhesive label is desirable is in the labeling of containers that undergo a pasteurization process. For example, in breweries, bottles are pasteurized after filling by placing them in hot water or steam which can cause labels to peel off the containers or create bubbles and wrinkles under the label.

Another situation wherein fully adherent labels would provide an advantage is in the use of thin stretchable labels. For example, inexpensive polyethylene or polypropylene labels can be produced that offer many excellent characteristics for labeling but are elastic and can stretch. If a thin film label could be made to adhere directly to the article or container, problems relating to label stretch after application to the container could be eliminated.

One prior art approach to providing a fully adhesive label for cans was proposed in Canadian Patent No. 1,012,906 to Germiat. The Germiat patent proposed using a coextruded label material wherein a extruded layer of surlyn was provided to act as an adhesive. Both the label material and can to be labeled were heated in the Germiat method while the label was being applied to cause the label to become adhesive and fully adhere to the container. Disadvantages associated with the Germiat label were that the adhesive did not always activate uniformly which could lead to wrinkles or bubbles forming between the container and label, especially after pasteurization.

In another unique labeling application, heat is used to shrink labels over the contours of containers as is disclosed in U.S. Pat. No. 4,704,173 which issued to Hoffman. With shrink labeling, as proposed in the Hoffman patent, the leading and trailing edges of the label have hot melt adhesive applied thereto in a generally vertical line at the leading and trailing edges of the label. The balance of the label is preferably free of adhesive so that the label can shift as it shrinks without causing wrinkling of the label material. While the wrap shrink labeling process of the Hoffman patent is popular and effective for many labeling applications, the lack of a full coating of adhesive makes this approach inappropriate for some applications.

The above problems and limitations relating to the prior art are addressed by Applicant's invention as summarized below.

SUMMARY OF THE INVENTION

This invention provides a labeling method in which a label is placed in a desired position on an article and then subsequently affixed to the article through the activation of a potentially adhesive coating, layer or surface that is substantially not adhesive when the label is initially placed on the article.

According to one approach to practicing the present invention, a label is applied to the surface of the article by adhering a first portion of the label to the article and then wrapping the label around the article. A second portion of the label is adhered to either the article or the label. The label includes a potentially adhesive interface which is defined as a surface which does not adhere to the article but can slide or shift while the label is wrapped around the article. The potentially adhesive interface can be later caused to adhere to the article by subsequent processing steps.

According to this method, rapid roll-fed label application can be achieved with a rapid tack hot melt glue applied to the leading and trailing edges of the label. The potentially adhesive interface can be applied by co-extrusion with the label, printing an adhesive on the label, printing an ink on the label which can be made adhesive, or spraying a coating on the label. Alternatively, the potentially adhesive surface could actually be the polymer used to form the label or the container.

The potentially adhesive interface could also be a coating or surface of the article. A coating of the article could be later activated by subsequent heating, application of radiant energy, exposure to a chemical agent or by application of a mechanical force.

Another advantage of fully bonding a label to an article is that the label can function to support and reinforce glass bottles allowing for thinner bottle walls and less chance of container breakage. A fully adherent label can also be provided that extends to the cap area of a container and can provide a very effective tamper evident labeling mechanism.

According to another aspect of the present invention, the labeling film can be caused to shrink about the contours of the container. In the course of the shrinking step, particularly when heat is used to cause the labeling film to shrink, a heat activatable adhesive can be activated.

Other approaches to the invention may include the use of a solvent to form an adhesive in situ on the leading and trailing or other portions of the label to render material adhesive in localized areas. Spot application of radiation or heat could also be used to provide, for example, a leading and trailing edge adhesive portion of the label while leaving the portions of the label between leading and trailing edges substantially unactivated until after the label has been placed on the container.

While the above methods are directed to roll-fed and cut and stack labeling techniques, the present invention can also be practiced with sleeve applied labels. Briefly, sleeve applied labels can be provided with a potentially adhesive interface between the article to be labeled and the sleeve. The sleeve may then be positioned on the article and either locally affixed to the article by fingers which hold the label in place on the article by a localized application or activation of adhesive, or by other mechanical retention mechanisms. The label can then either be shrunk on to the article or adhered to the article by activating the potentially adhesive interface after the step of affixing the label on to the article.

According to the invention, a new label can be provided for containers when there is a need to change the labeling on the container due to an ingredient change or a mistake in the printing of containers such as cans that are directly lithographed. It may also be advantageous to be able to provide a new label for an article if government labeling regulations change. The present invention can be used in conjunction with any article. However, one particularly appropriate field is the labeling of containers of various types. Containers including plastic containers, glass containers, metal cans and paperboard containers are all widely used and can benefit from the advantages of the present invention.

These and other advantages and objects of the invention will become readily apparent upon review of the attached drawings in light of the detailed description of the drawings and the preferred embodiments of the invention that follow.

DETAILED DESCRIPTION OP THE INVENTION

Figure 1:
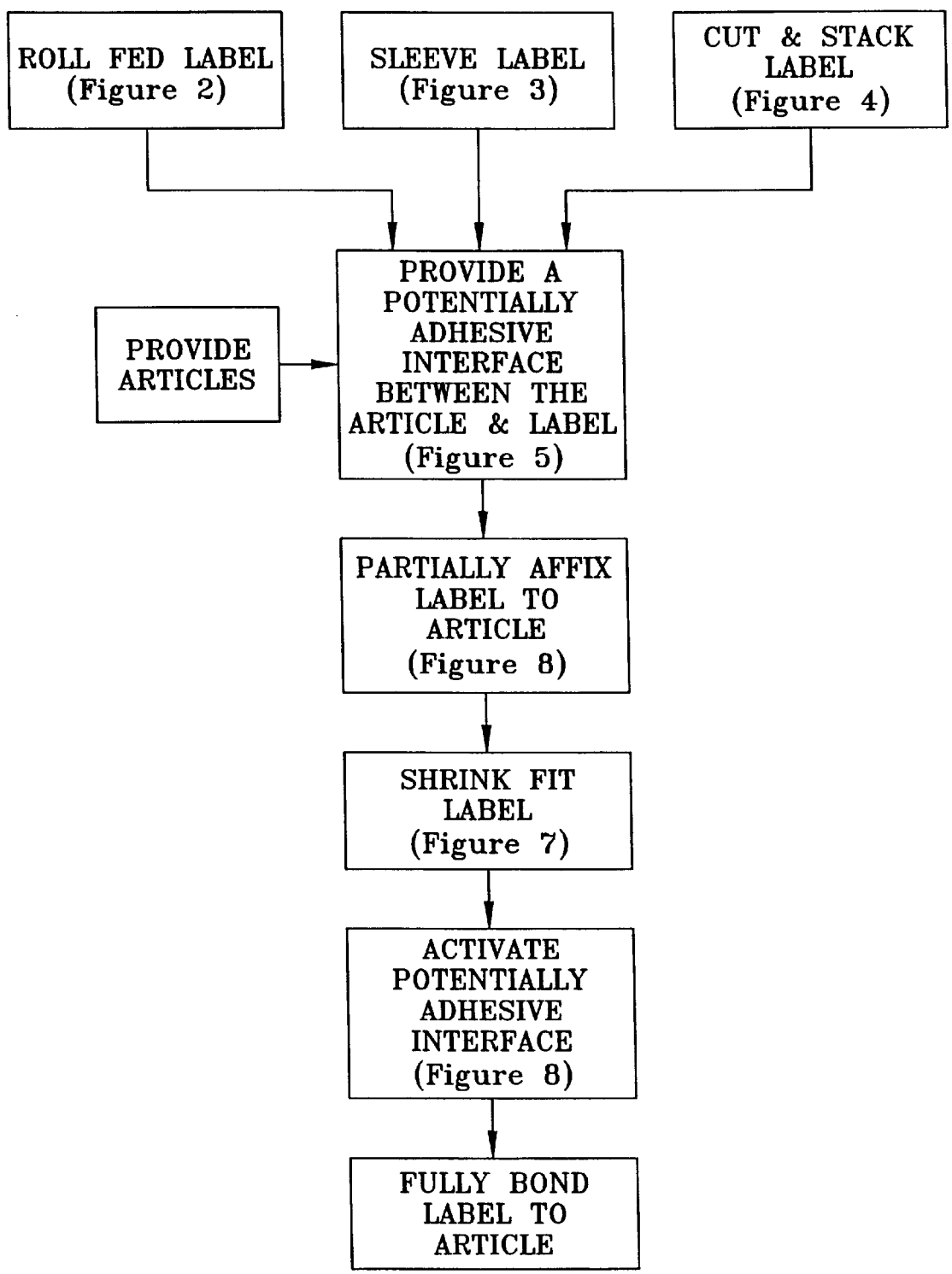
FIG. 1 is a flow chart illustrating the steps of the labeling method of the present invention.

Referring now to FIG. 1, a flow chart showing various alternatives and an example of an arrangement of the steps of the invention are shown diagrammatically. Each of the figures of the drawing are referred to in the appropriate steps illustrated in FIG. 1.

Figure 2:
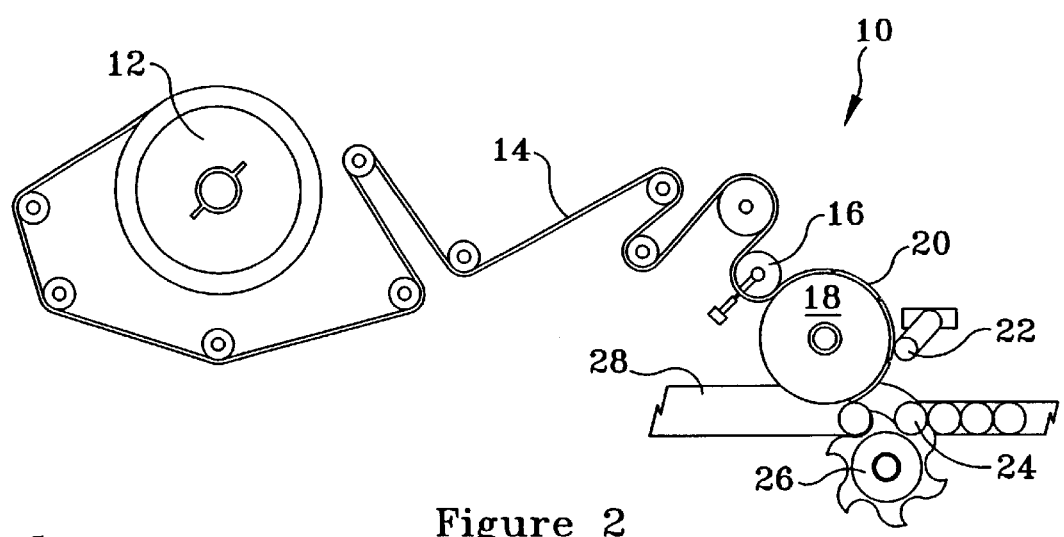
FIG. 2 is a schematic plan view of a roll fed labeling line.
Figure 3:
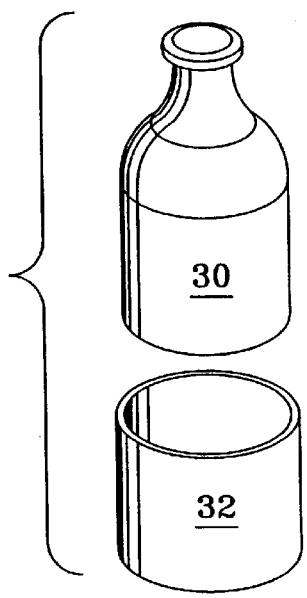
FIG. 3 is a schematic perspective view of a sleeve applied labeling method.
Figure 4:
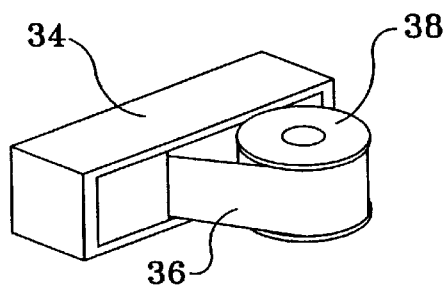
FIG. 4 is a schematic perspective view of a cut and stack labeling method.

Referring to FIGS. 1 through 4, the present invention is shown as being amenable to a wide variety of labeling techniques. Specifically illustrated are roll fed labeling, as shown in FIG. 2, sleeve applied labels, as shown in FIG. 3, and cut and stack labels, as shown in FIG. 4. With any of the labeling methods shown in FIGS. 2 through 4, a label is provided for labeling an article such as a container.

Referring now to FIG. 2, a roll fed labeler 10 is shown diagrammatically wherein a roll 12 of label material is unwound with a web 14 of labeling material being fed to a label cutter 16. A vacuum drum 18 receives and supports individual labels 20 that are cut off by the cutter 16 from the web 14. The vacuum drum 18 supports the labels 20 as glue is applied by a glue applicator 22 prior to applying the label 20 to a container 24. Containers 24 are fed to the vacuum drum 18 in a sequential relationship by means of a star wheel 26 which picks up the containers 24 from a conveyor 28, feeds into the vacuum drum 18 and then deposits them after labeling on the conveyor 28.

A wide variety of labeling materials can be provided including paper labels, paper/polypropylene laminate labels, expanded polystyreneform labels, film labels including polyethylene, polypropylene, and polystyrene films in combinations or laminations of such materials.

The labels can be cut by the cutter 16 into lengths sufficient to fully encircle a container 24 or provide only a spot label on the container 24. The glue applicator 22 can apply leading and trailing edge glue patterns, picture frame, spaced dots., lines of adhesive or a broad band knurled roll adhesive pattern.

According to the present invention, the glue applicator 22 would not provide a full pattern adhesive, but would leave substantial portions of the label 20 without application of any adhesive which is in an adhesive state prior to application of the label 20 to the container 24. The glue applicator 22 can be used to apply hot melt glue, cold glue or a solvent which can form an adhesive in situ when applied to a label 20. Alternatively, the glue applicator 22 could be another apparatus capable of forming an adhesive portion on a label 20. For example, a hot bar, hot air jet, radiation emitter or a water applicator could be provided that could be matched to a particular label or label coating to provide a localized adhesive which would enable a container 24 to pick up the label 20 and tack the label 20 to the container 24 as it is wrapped by the label 20.

Referring now to FIG. 3, the sleeve applied labeling method is illustrated by a bottle 30 disposed over a sleeve label 32 which is positioned to be slipped on to the bottle 30 from below. The disclosure of a sleeve applied labeling system as disclosed in U.S. Pat. No. 3,822,459 is hereby incorporated by reference.

Referring now to FIG. 4, a cut and stack labeling magazine is shown wherein a label 36 is picked up by an object 38 from a label magazine 34.

Regardless of the label supply mechanism, a potentially adhesive interface is provided between the label and the article to be labeled. The potentially adhesive interface can comprise a printed adhesive material on the label, a layer of latent adhesive material which is co-extruded with the polymer label, a separate sheet made up of adhesive material, a coating provided on the article to be labeled or a surface of the polymer label material or article which can be rendered adhesive by a subsequent processing step.

Figure 5:
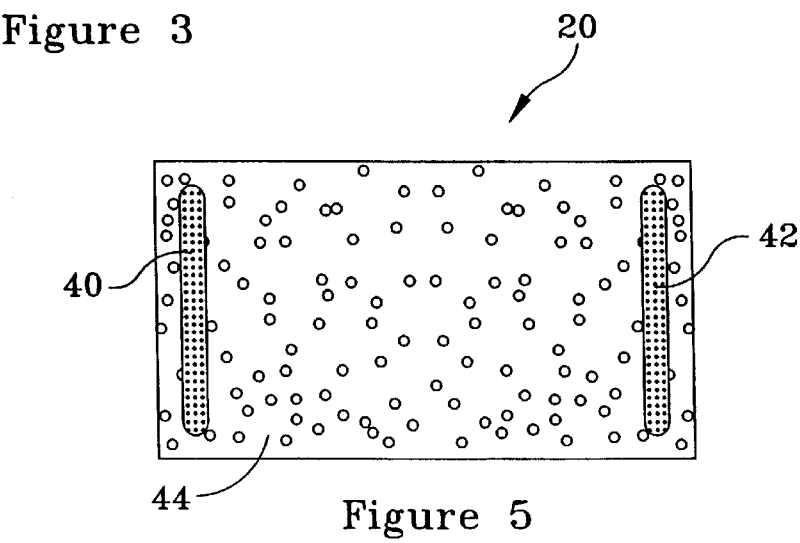
FIG. 5 is a plan view of a label having a leading and trailing edge adhesive pattern and a coating of a potentially.adhesive material between leading and trailing edges.

As shown in FIG. 5, a label segment 20 is shown which could be provided by the roll fed labeler of FIG. 2 or cut and stack labeler of FIG. 4. The label 20 includes a leading edge adhesive strip 40 and a trailing edge adhesive strip 42. The portions of the label 20 not covered by the leading and trailing edge adhesive strips 40 and 42 are coated with a latent adhesive coating 44 which can be provided as described above.

Figure 6:
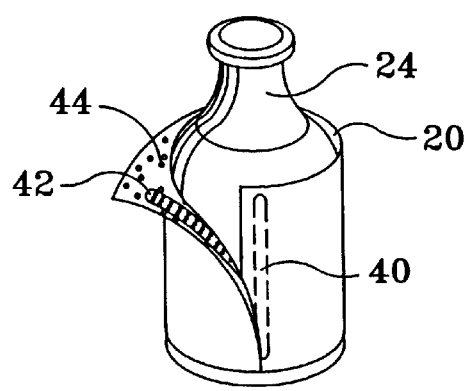
FIG. 6 is a schematic view showing a container with a label being applied thereto with a leading and trailing edge glue pattern and an intermediate potentially adhesive interface.

As shown in FIG. 6, the leading edge adhesive 40 is presented to the container 24 to provide a quick pick up as the container contacts the label segment 20. The container is rotated to cause the label to wrap around the container 24 until the trailing edge adhesive 42 overlaps and bonds to the outwardly facing portion of the label 20. As the label 20 is wrapped around the container 24, the label is permitted to shift and move freely without any interference from an active adhesive which could cause the label to begin to bond and result in wrinkles or other surface imperfections. While the latent adhesive coating 44 could have some minimal adhesive properties, the preferred coating would not stick to the container during the labeling process at least until the label is affixed to the container. The label could be directly affixed to the article by means of the trailing edge adhesive 42.

Figure 7:
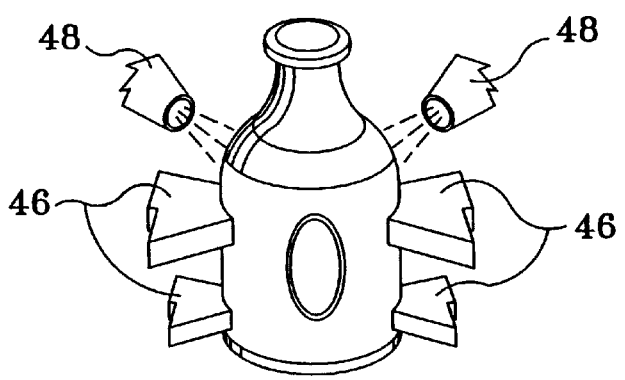
FIG. 7 is a schematic view of a container which is being subjected to hot air for shrinking portions of the label around the contours of the container.
Figure 8:
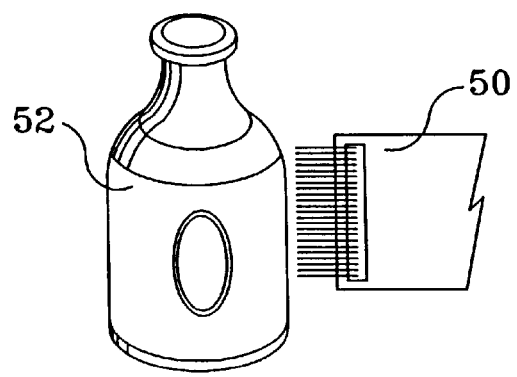
FIG. 8 is a schematic view of a container to which hot air is directed to cause the potentially adhesive interface to be activated and fully adhered to the container.

Alternatively, the label could be affixed by partially shrinking a sleeve 32 over the contours of a bottle 30 or other container such as a metal can. Fingers 46 hold the label 20, or sleeve 32, on the bottle 30, or other container, while the label is being subjected to hot air from a hot air source 48. After the label is located and affixed to the article or container, the shrinking of the label over the contours can continue as shown in FIG. 7. Whether or not shrinking over the contours is required, the label can be permanently attached over its entire surface by activating the potentially adhesive interface as shown in FIG. 8, wherein hot air is directed from a hot air source 50 to form a fully adhered label 52.

Various mechanisms can be utilized to provide the delayed adhesive function of the present invention. The selection of the potentially adhesive interface will determine the activation mechanism. An example of a heat activated adhesive would be to spray Century CX887 or CelluCraft White Coat adhesives sold by Century Adhesives and CelluCraft respectively on the inner side of a polyethylene and polypropylene laminate film label. Other alternative activation mechanisms could include radiation which may take the form of a infrared or other light source, microwave radiation or other commercially available radiation source which can activate an adhesive or polymer to cause it to become adhesive. Other types of latent adhesives could be activated by application of water, application of chemical of fluids or gases or a time delayed adhesive which would become more adhesive over time. Another latent adhesive could be a micro encapsulated adhesive which could include micro capsules of, for example, epoxy components which when subjected to pressure or mechanical stresses would rupture and cause an epoxy bond to be formed between the article and the label.

While the invention, as described above, generally focuses on application of the potentially adhesive interface to the label, it is also possible that the potentially adhesive interface could be formed on the bottle or other article by spraying, dipping, or otherwise coating the article prior to labeling. If the potentially adhesive interface is formed on the container or article, it is maintained in a latent adhesive state prior to application of the label and only activated after the label is affixed in the desired orientation on the article or container.

While the potentially adhesive interface is generally anticipated to be an interface that would cover the entire area between the label and the bottle, it is also anticipated that a partial coverage of the area could be used. For example, if it would be desirable to provide a coupon on the label it would be preferable to avoid application of the latent adhesive material behind the coupon so that it can be readily separated form the article or container.

Referring now to FIG. 1, the last step is the provision of a fully bonded label on an article or container. By bonding the label to the article after it has assumed its final position on the article or container, it is believed that a consistent high quality label can be provided.

The above description of preferred embodiments of the invention is provided by way of example and not by way of limitation. The broad scope of applicant's invention is to be construed in accordance with the following claims.

What is claimed is:

1. A heat shrink label for full coat bonding to a surface on an article comprising:

a sheet of heat shrinkable label stock dimensioned to be placed on the article surface;

a layer of adhesive disposed on a first portion of one side of the sheet stock and arranged to provide initial bonding of the label to the article surface; and a layer of delayed activation adhesive substantially covering the remaining portion of the one side of the sheet stock not covered by the adhesive layer so as to provide full coat bonding of the label to the surface of the article.

2. The label of claim 1 wherein the layer of delayed activation adhesive comprises a coating of activatable adhesive provided on the label and maintained in a substantially non-adhesive state to allow the portion of the label not covered by the layer of adhesive to allow the sheet stock to be shifted on the surface of the article during the full coat bonding process.

3. The label of claim 1 wherein sheet stock material comprises a material that can be rendered adhesive but is maintained in a substantially non-adhesive state to form the layer of delayed activation adhesive.

4. The label of claim 1 wherein the layer of adhesive comprises hot melt glue applied to a leading and trailing end of the sheet.

5. The label of claim 1 wherein the layer of delayed activation adhesive comprises a potentially adhesive material printed onto the entire side of sheet stock.

6. The label of claim 1 wherein the layer of delayed activation adhesive comprises a potentially adhesive material printed in a pattern on the side of the sheet stock.

7. The label of claim 1 wherein the label stock is selected from one of the group consisting of laminate, expanded polystyrene foam, and polyethylene, polypropylene, and polystyrene films in combinations or laminations thereof.

8. The label of claim 1 wherein the layer of delayed activation adhesive comprises a microencapsulated adhesive that is activated by applying a mechanical force to the label during the full coat bonding process.

* * * * *